(12) United States Patent
Franz

(10) Patent No.: US 8,162,129 B2
(45) Date of Patent: Apr. 24, 2012

(54) CONVEYANCE MEANS

(75) Inventor: Gmeiner Franz, Sinzing Ortsteil Eilsbrunn (DE)

(73) Assignee: Krones AG, Neutraubling (DE)

( * ) Notice: Subject to any disclaimer, the term of this patent is extended or adjusted under 35 U.S.C. 154(b) by 221 days.

(21) Appl. No.: 12/063,102

(22) PCT Filed: Jan. 20, 2007

(86) PCT No.: PCT/EP2007/000485
§ 371 (c)(1),
(2), (4) Date: Jul. 29, 2010

(87) PCT Pub. No.: WO2007/104377
PCT Pub. Date: Sep. 20, 2007

(65) Prior Publication Data
US 2010/0314223 A1 Dec. 16, 2010

(30) Foreign Application Priority Data
Mar. 16, 2006 (DE) .......................... 10 2006 012 148

(51) Int. Cl.
*B65G 47/51* (2006.01)
*B65G 43/08* (2006.01)
(52) U.S. Cl. ................ 198/475.1; 198/465.4; 198/476.1
(58) Field of Classification Search ............... 198/465.4, 198/474.1, 475.1, 476.1, 678.1, 680, 681, 198/685
See application file for complete search history.

(56) References Cited

U.S. PATENT DOCUMENTS

| | | |
|---|---|---|
| 1,810,419 A | 4/1930 | Francis |
| 2,788,140 A | 4/1957 | Becker |
| 3,297,138 A | 1/1967 | McCombie |
| 3,575,282 A | 4/1971 | Gaiotto et al. |
| 3,664,487 A | 5/1972 | Ballenger |

(Continued)

FOREIGN PATENT DOCUMENTS

CA 2364216 6/2003
(Continued)

OTHER PUBLICATIONS

Dynac Model 6400 Series General Specification Brochure, 2002, Hartness International, Greenville, SC, US (2 pp.).

(Continued)

*Primary Examiner* — Douglas Hess
(74) *Attorney, Agent, or Firm* — Marshall, Gerstein & Borun, LLP

(57) ABSTRACT

A conveying means (1) is described having running rollers (7) which can be supported on a guide (2). At least one running roller (7) is mounted on a roller lever (12*a*) which can be pivoted between a first and a second position with the aid of a pivoting mechanism (13, 33) and can be locked in a position. In order to make a conveying means of this type simpler in structural terms and less susceptible to wear, it is proposed to equip the pivoting mechanism (13, 33) with a toggle lever (14) which is connected to an actuating element (21), wherein the toggle lever comprises a first and a second lever element (14*a*, 14*b*) which are connected to one another via a joint (15).

4 Claims, 6 Drawing Sheets

U.S. PATENT DOCUMENTS

| | | |
|---|---|---|
| 3,968,861 A | 7/1976 | Kernen |
| 4,018,325 A | 4/1977 | Rejsa |
| 4,036,356 A * | 7/1977 | Reist ............................ 198/680 |
| 4,269,299 A | 5/1981 | Goodman |
| 4,294,345 A | 10/1981 | Stauber et al. |
| 4,399,909 A | 8/1983 | Gorelik |
| 4,413,724 A | 11/1983 | Fellner |
| 4,468,277 A | 8/1984 | Kontz |
| 4,469,219 A | 9/1984 | Cosse |
| 4,506,779 A * | 3/1985 | Seragnoli .................... 198/459.1 |
| 4,513,858 A | 4/1985 | Fellner et al. |
| 4,549,647 A | 10/1985 | Cosse |
| 4,565,284 A | 1/1986 | Seragnoli et al. |
| 4,838,410 A | 6/1989 | Gough |
| 4,903,823 A | 2/1990 | Plesser et al. |
| 4,909,373 A * | 3/1990 | Geerts ...................... 198/370.05 |
| 4,989,718 A | 2/1991 | Steeber |
| 5,022,609 A | 6/1991 | Cranston |
| 5,038,900 A * | 8/1991 | Durant et al. .............. 198/465.4 |
| 5,076,422 A | 12/1991 | clopton |
| 5,129,506 A | 7/1992 | Gutov et al. |
| 5,191,959 A | 3/1993 | Leemkuil |
| 5,253,742 A * | 10/1993 | Dooley .......................... 198/680 |
| 5,257,888 A * | 11/1993 | Kronseder .............. 414/416.06 |
| 5,413,213 A | 5/1995 | Golz et al. |
| 5,429,227 A | 7/1995 | Krossmann et al. |
| 5,490,589 A | 2/1996 | Golz et al. |
| 5,529,191 A * | 6/1996 | Washeim ...................... 209/523 |
| 5,620,084 A | 4/1997 | Mensch |
| 5,645,159 A | 7/1997 | Luginbuhl et al. |
| 5,722,655 A | 3/1998 | Reist |
| 5,772,005 A | 6/1998 | Hansch |
| 5,863,571 A | 1/1999 | Santais et al. |
| 5,996,322 A | 12/1999 | La Barre |
| 6,079,541 A | 6/2000 | Bercelli et al. |
| 6,105,338 A * | 8/2000 | Kalany et al. .................... 53/252 |
| 6,119,848 A | 9/2000 | Hartness, III et al. |
| 6,152,291 A | 11/2000 | Steeber et al. |
| 6,168,004 B1 | 1/2001 | Drewitz et al. |
| 6,182,812 B1 | 2/2001 | Hartness, III et al. |
| 6,209,710 B1 * | 4/2001 | Mueller et al. .............. 198/470.1 |
| 6,209,716 B1 | 4/2001 | Bogle et al. |
| 6,230,874 B1 | 5/2001 | Steeber et al. |
| 6,241,074 B1 | 6/2001 | Steeber |
| 6,260,688 B1 | 7/2001 | Steeber et al. |
| 6,334,528 B1 | 1/2002 | Bogle et al. |
| 6,354,427 B1 | 3/2002 | Pickel et al. |
| 6,382,398 B2 | 5/2002 | Steeber et al. |
| 6,394,260 B1 | 5/2002 | Barth et al. |
| 6,446,781 B1 | 9/2002 | De Villele |
| 6,497,321 B2 | 12/2002 | Horton et al. |
| 6,520,318 B1 | 2/2003 | Humele |
| 6,523,669 B1 | 2/2003 | Steeber et al. |
| 6,533,103 B2 | 3/2003 | Hartness et al. |
| 6,550,602 B2 | 4/2003 | Steeber et al. |
| 6,585,104 B2 | 7/2003 | Horton et al. |
| 6,591,963 B2 | 7/2003 | Wipf |
| 6,601,697 B2 | 8/2003 | Steeber et al. |
| 6,612,420 B1 | 9/2003 | Hartness, III et al. |
| 6,662,936 B2 | 12/2003 | Ikemoto et al. |
| 6,698,581 B2 | 3/2004 | Duterte et al. |
| 6,725,997 B2 | 4/2004 | Draghetti |
| 6,725,998 B2 | 4/2004 | Steeber et al. |
| 6,761,264 B2 | 7/2004 | Steeber et al. |
| 6,779,651 B1 | 8/2004 | Linglet et al. |
| 6,817,464 B2 | 11/2004 | Biondi et al. |
| 6,846,145 B2 | 1/2005 | Remericq |
| 6,848,563 B2 | 2/2005 | Abert et al. |
| 6,896,120 B2 | 5/2005 | Barry et al. |
| 6,959,953 B2 | 11/2005 | Graffin |
| 6,973,767 B2 | 12/2005 | Wagner et al. |
| 7,021,452 B2 | 4/2006 | Horton et al. |
| 7,032,742 B2 | 4/2006 | Hartness et al. |
| 7,140,870 B2 | 11/2006 | Nava |
| 7,191,896 B2 | 3/2007 | Hartness et al. |
| 7,219,788 B2 | 5/2007 | Tuck et al. |
| 7,264,113 B2 | 9/2007 | Hartness et al. |
| 7,278,531 B2 | 10/2007 | Hartness et al. |
| 7,299,832 B2 | 11/2007 | Hartness et al. |
| 7,311,515 B2 | 12/2007 | Netsu |
| 7,331,156 B2 | 2/2008 | Hartness et al. |
| 7,334,677 B2 | 2/2008 | Mader |
| 7,413,072 B2 | 8/2008 | Horton et al. |
| 7,431,142 B2 | 10/2008 | Eberle |
| 7,442,031 B2 | 10/2008 | Netsu |
| 7,543,697 B2 * | 6/2009 | Legallais .................... 198/478.1 |
| 7,669,385 B2 * | 3/2010 | Sichera et al. .................... 53/53 |
| 7,810,629 B2 * | 10/2010 | Kronseder et al. ......... 198/347.1 |
| 2002/0053499 A1 | 5/2002 | Zurcher |
| 2002/0144880 A1 | 10/2002 | Ikemoto et al. |
| 2002/0195317 A1 | 12/2002 | Wipf |
| 2003/0085103 A1 | 5/2003 | Horton et al. |
| 2003/0155212 A1 | 8/2003 | Abert et al. |
| 2007/0235288 A1 | 10/2007 | Horton et al. |
| 2008/0142336 A1 | 6/2008 | Kronseder et al. |
| 2008/0210520 A1 | 9/2008 | Legallais |
| 2008/0223691 A1 | 9/2008 | Nishi et al. |

FOREIGN PATENT DOCUMENTS

| | | |
|---|---|---|
| DE | 1 080 580 | 4/1960 |
| DE | 2610833 | 9/1977 |
| DE | 2618905 | 11/1977 |
| DE | 19824846 | 12/1999 |
| DE | 19928325 | 12/2000 |
| DE | 29913237 | 12/2000 |
| DE | 102004053663 | 8/2005 |
| DE | 202005013552 U1 | 11/2005 |
| DE | 202006003690 | 6/2006 |
| DE | 10 2006 012 148 A1 | 9/2007 |
| EP | 0506551 | 9/1992 |
| EP | 0581143 | 2/1994 |
| EP | 0734978 | 10/1996 |
| EP | 1161391 | 12/2001 |
| EP | 1275603 | 1/2003 |
| EP | 1295820 | 3/2003 |
| EP | 1389595 | 2/2004 |
| EP | 1832533 | 9/2007 |
| FR | 2745804 | 9/1997 |
| FR | 2766803 | 2/1999 |
| GB | 1301843 | 1/1973 |
| GB | 2047667 | 12/1980 |
| GB | 2143788 | 2/1985 |
| GB | 2300613 | 11/1996 |
| JP | 61197376 A | 9/1986 |
| JP | S 61-197376 | 9/1986 |
| JP | 70-46977 | 2/1995 |
| RU | 2160694 | 12/2000 |
| RU | 2198835 | 2/2003 |
| WO | WO-97/09257 | 3/1997 |
| WO | WO-00/43294 | 7/2000 |
| WO | WO-01/10754 | 2/2001 |
| WO | WO-01/98187 | 12/2001 |
| WO | WO-02/072454 | 9/2002 |
| WO | WO 2005/073113 A2 | 8/2005 |
| WO | WO-2007/025598 | 3/2007 |

OTHER PUBLICATIONS

Dynac 6000 Series Brochure, Hartness International, Greenville, SC, US (2 pp.).

Dynac Model 7000 Brochure, Hartness International, Greenville, SC, US (2 pp.).

Dynac 7000 Series General Specification Brochure 2002, Hartness International, Greenville, SC, US (2 pp.).

Anonymous, "Paternoster", 7 pp., Retrieved from the Internet on Apr. 28, 2008: http://en.wikipedia.org/wiki/Paternoster.

Anonymous, "Paternoster lift, also known as the cyclic elevator", 3 pp., Retrieved from the Internet on Apr. 18, 2008: http:www.dartfordarchive.org/uk/technology/magnified/cyclic_elev.htm.

Written Opinion for PCT/EP2007/000485 mailed Nov. 13, 2008.

International Search Report and Written Opinion for International Application No. PCT/EP2005/010747 (Nov. 21, 2005).

International Preliminary Report on Patentability for corresponding International Application No. PCT/EP2005/010747 (Apr. 24, 2007).

International Preliminary Report on Patentability for corresponding International Application No. PCT/EP2007/000485 (Nov. 4, 2008).

International Search Report and Written Opinion for International Application No. PCT/EP2006/006648 (Sep. 25, 2006).

International Preliminary Report on Patentability for International Application No. PCT/EP2006/006648 (Apr. 15, 2008).

International Search Report and Written Opinion for International Application No. PCT/EP2007/005824 (Feb. 17, 2009).

International Preliminary Report on Patentability for International Application No. PCT/EP2007/005824 (Feb. 17, 2009).

International Search Report and Written Opinion for International Application No. PCT/EP2005/000942 (Sep. 30, 2005).

International Preliminary Report on Patentability for International Application No. PCT/EP2005/000942 (Oct. 3, 2006).

Non-final Office Action for U.S. Appl. No. 11/663,097 (Apr. 13, 2009).

Non-final Office Action for U.S. Appl. No. 10/588,046 (Nov. 21, 2008).

Final Office Action for U.S. Appl. No. 10/588,046 (Jun. 8, 2009).

International Search Report and Written Opinion for International Application No. PCT/EP2007/000305 (Apr. 19, 2007).

International Preliminary Report on Patentability for International Application No. PCT/EP2007/000305 (Oct. 14, 2008).

* cited by examiner

CONVEYANCE MEANS

The present application claims the benefit of priority of International Patent Application No. PCT/EP2007/000485, filed on Jan. 20, 2007, which application claims priority of German Patent Application No. 10 2006 012 148.1, filed Mar. 16, 2006. The entire text of the priority application is incorporated herein by reference in its entirety.

FIELD OF THE DISCLOSURE

The disclosure relates to a conveyance means of the type used as an accumulator or dynamic storage device between work station, for example, and also to a chain link and a conveyance device.

BACKGROUND

A conveyance means, a chain link, and a conveyance device of this type are known from WO 2005/073113. The known conveyor chain is used in a conveyance device for the dynamic storage of objects. For this purpose, a conveyance means which is designed as a conveyor chain is guided in a guideway between a feed station and a delivery station in an endless way. The conveyor chain acts as pull strand in one area, and as a return strand in another area, where the length of the pull strand and of the return strand is variable, and can be adjusted depending on the quantity of objects to be conveyed or stored. To vary the length of the pull strand and of the return strand, a sliding carriage is provided, which runs on mutually parallel sections of the guideway. The sliding carriage contains in each case a curved deflection member for the pull strand and for the return strand, so that, as a result of the shifting of the sliding carriage along the guideway areas, the portion of the conveyor chain that acts as pull strand can be increased or decreased, compared to the portion of the return strand. The conveyor chain is supported by track rollers on the guideway. However, in the transition from the guideway to the sliding carriage it is necessary for at least some of the track roller to be rendered inoperative temporarily to separate the track rollers from the guideway, and to guide them either onto the sliding carriage, or from the sliding carriage back onto the guideway. In the known conveyor chain, this is achieved by constructing at least one track roller so it can be swiveled, where the swiveling occurs with the help of a swivel mechanism. With the swivel mechanism of the known conveyor chain, this occurs via a pawl which is prestressed with a torsion spring. The pawl acts together with a cross bolt, which is arranged parallel to the rotation axle and connected to the track roller. The pawl is designed so that it stops the track roller in its engaged position with the guideway, when the pawl is engaged with the cross bolt. The pawl is connected to an actuation finger, which can be moved by a control surface associated with the sliding carriage so that the pawl is moved against the force of the spring out of its engagement with the cross bolt, and thus releases the track roller for swiveling. The swivel position of the track roller is then defined by a grooved curve on the sliding carriage. As soon as the track roller needs to be again in its normal conveyance position, it is swiveled back by the grooved curve, and then the pawl is moved again into engagement with the cross bolt, and the track roller is stopped. The pawl thus must abut in the pull strand and in the return strand against the cross bolt during each pass of the sliding carriage, causing, on the one hand, unnecessary noises, and, on the other hand, an increase in wear. In addition, two control curves are necessary, one for the pawls and one for swivelling the rollers.

SUMMARY OF THE DISCLOSURE

The disclosure is thus based on the problem of providing a conveyor chain of the mentioned type with an improved and simplified swivel mechanism.

By using a knee lever, the swivel mechanism can be simplified decisively. The knee lever can be connected directly to the roller lever of the track roller, and, accordingly, it does not have to abut against across bolt or other construction elements to swivel the track roller. In addition, only one control curve for the knee lever is required.

Thus, a knee lever continues to offer the decisive advantage that, to stop the track roller in a certain position, lever members of the knee lever only need to be stopped in a certain position relative to each other. This can occur by means of spring elements of the greatest variety, self inhibition, magnetic elements, or similar devices.

BRIEF DESCRIPTION OF THE DRAWINGS

Embodiment examples of the disclosure are explained in greater detail below with reference to the drawing. In the drawing.

DETAILED DESCRIPTION

The invention is described below in reference to a conveyance device F with a dynamic storage device V1, but it can be used in all cases where it is necessary or appears desirable to swivel a track roller of a conveyance means in a controlled way.

Figure 1:
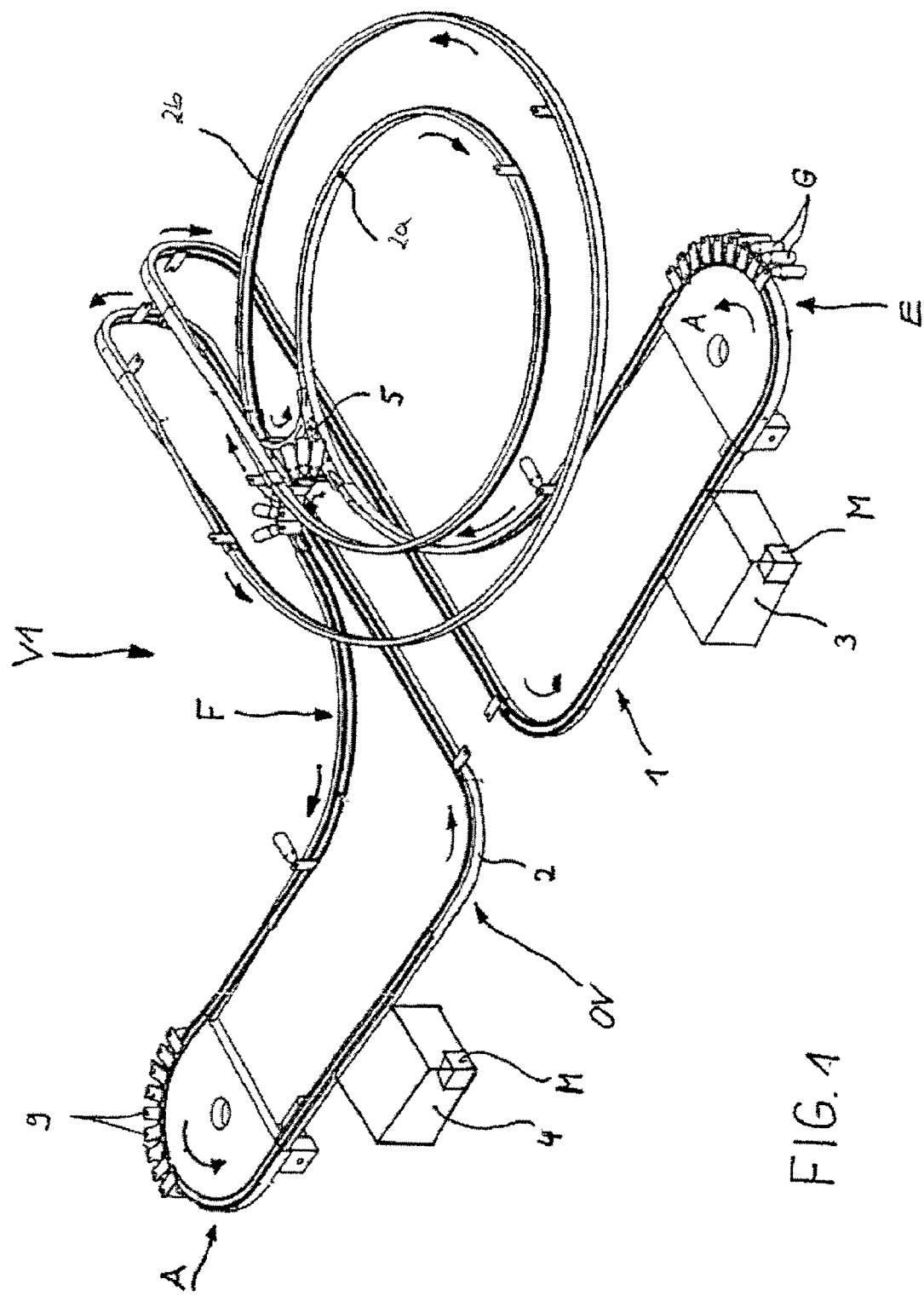
FIG. 1 shows a schematic representation of a conveyance device with which the present disclosure can be used.

In the represented embodiment example according to FIG. 1, the conveyance device F corresponds to the conveyance device according to WO 2005/073113 whose disclosure content is herewith included by reference. The conveyance device F is preferred for conveying objects G, such as, bottles or containers, between different work stations, such as, for example, between a stretch blow molding machine and a labeling machine, or between a filling machine and a closing machine, and a packaging machine or a similar device, and it contains substantially a single, endless conveyance means 1 in the form of a roller chain, i.e., in the form of a link or conveyor chain which is provided with a track roller for transporting objects G. The conveyance means 1 is guided through a stationary guideway 2 in such a way that it moves past a feed station E and a delivery station A. The conveyance means 1 is driven in the area of the feed station through a first drive device 3 by a motor M, and in the area of the delivery station A through a second drive device 4 by a motor M. The feed and delivery stations E and A are followed by a first, freely guidable area, which, in the represented embodiment example, is a longitudinal oval area OV of the guideway 2. Moreover, the dynamic storage device V1 contains helical areas 2a, 2b of the guideway 2, which run mutually parallel and at equal separation from each other. In these areas 2a, 2b, a sliding carriage 5 can be moved, which is represented in greater detail in FIG. 2. With the help of this sliding carriage 5, the length of the pull strand of the conveyance means 1 between the feed station E and the delivery station A can be adapted to the quantity of objects to be conveyed, to lengthen or shorten the pull strand with respect to the return strand between the delivery station A and the feed station E.

Figure 2:
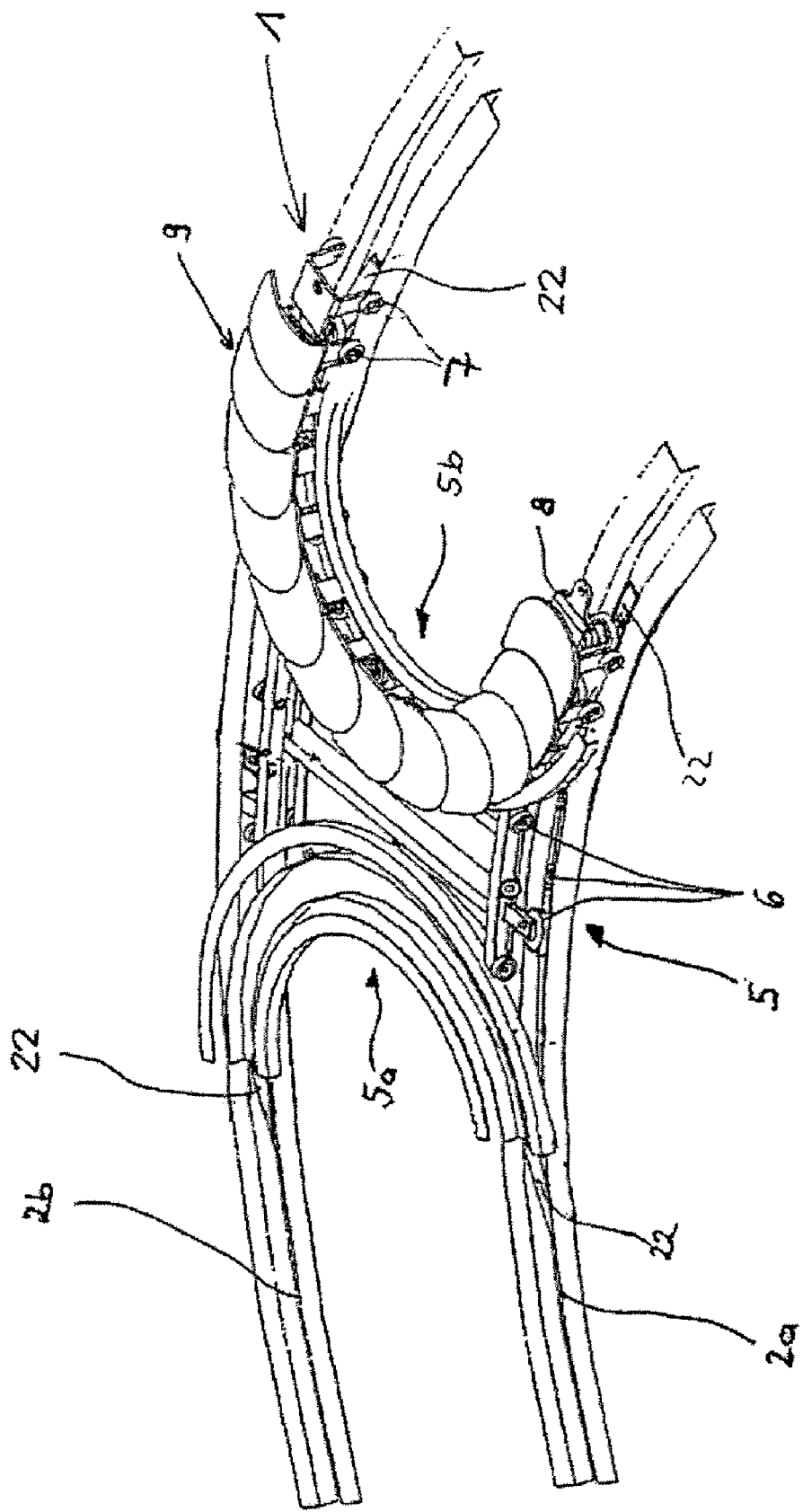
FIG. 2 shows an enlarged detail of FIG. 1.

To achieve this, the sliding carriage 5, as shown in FIG. 2, contains a first 180° deflection member 5a and a second 180° deflection member 5b, opposite the deflection member 5a. Each deflection member 5a, 5b interconnects opposite places of the parallel areas 2a, 2b of the guideway 2 in such a way that the conveyance means can move from the area 2a into the area 2b. The first deflection member 5a is associated with the pull strand and the second deflection member 5b with the return strand.

The sliding carriage 5 is moved along the parallel areas 2a, 2b as a result of a difference in the speeds of the drive stations 3 and 4. To shorten the pull strand of the conveyance means 1, the sliding carriage 5 is moved through the conveyance means 1 as a result of an appropriate difference in the speeds of the drive stations 3 and 4 in the direction towards the feed station E and the delivery station A. To shorten the return strand, the sliding carriage 5 is moved away from the feed station E and the delivery station A due to an appropriate difference in the speeds of the drive stations 3 and 4.

The conveyance means 1 is supported, as shown in FIG. 2, right side, by the track rollers 7 on the guideway 2. The guideway 2 can be of any appropriate shape, for example, it can contain two or more parallel rods, profiles of different cross sections, or similar parts. Moreover, as can be seen particularly in FIG. 1, twisted places can be provided to swivel the objects G to be contained in a horizontal position and back again.

Figure 3:
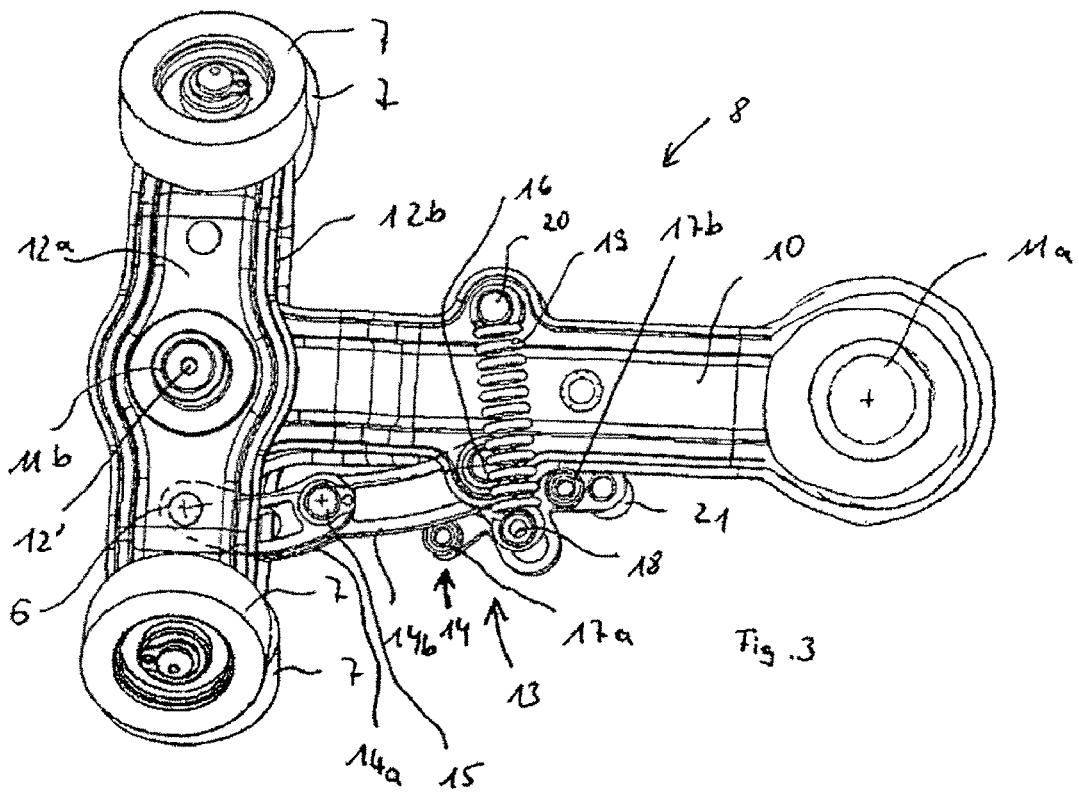
FIG. 3 shows a first embodiment example of the disclosure.
Figure 4:
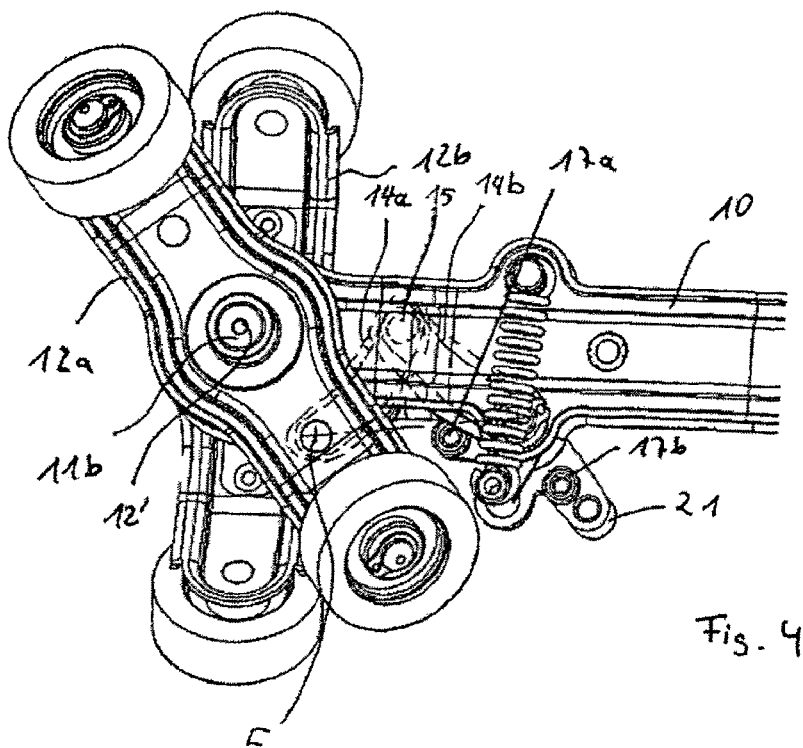
FIG. 4 shows the embodiment example according to FIG. 3 with a swiveled track roller.

In the represented embodiment example, the conveyance means consists of a plurality of chain link-like structures 8, which are interconnected one after the other by articulations, and which each carry track rollers 7 and a hold device 9 for the objects G. The chain links 8 must be such that they cannot move by themselves, thus they may also present a design which would lead to an unstable position of the rollers on the guideway if the individual chain links 8 do not support each other mutually. Such a chain link 8 is represented in greater detail, for example, in FIGS. 3 and 4. The fork-like chain link 8 receives a carrier 10, on whose two ends bearing elements 11a, 11b are provided to connect by articulation a plurality of the chain links 8 to form the endless conveyance means 1. It is preferred for the storage means 11a, 11b to contain an articulation which can be swiveled to all sides, for example, a cup and ball bearing, so that the conveyance means 1 can move in space. On the support 11, the track rollers 7 are also attached at places which are determined by the guideway 2 and in an orientation determined by the guideway 2. The track rollers 7 of FIGS. 3 and 4 are designed, for example, for parallel, superposed rods (FIG. 7) or a roof-shaped running profile of the guideway 2 or a similar part. On the chain link 8, four track rollers 7 are provided, which are attached rotatably in pairs to a roller lever 12a and 12b, respectively, which is constructed as a double lever. The roller levers 12a, 12b protrude on both sides from the support 10, resulting in a substantially T-shaped arrangement of the roller levers 12a, 12b with respect to the support 10.

At least one of the roller levers, in the represented embodiment example roller lever 12a, is attached rotatably to the support 10 via a rotation axle 12' in such a way that it can form with the support 10 an angle that is different from 90°. The other roller lever 12b is fixed in a 90° position with respect to the support 10 to the latter. However, as needed, the roller levers 12 can be connected at other angles or in another way to the support 10.

To move the swivelable roller lever 12a in an angular position that deviates from the roller lever 12b with respect to the support 10, a spring-loaded swivel mechanism 13 is provided. The swivel mechanism 13 contains a knee lever 14, which contains a first and second lever member 14a, 14b, which are connected via an articulation 15 to each other in a way which allows swiveling. The first lever member 14a is connected to the swivelable roller lever 12a via an articulation 6 in such a way that, if the lever element 14a is moved, the roller lever 12a can be swiveled about its axle 12'. For this purpose, the first lever element 14a engages, at a separation from the axle 12', on the roller lever 12a. The second lever element 14b is attached in a way which allows swiveling to the support 10 about an axle 16 formed by a bearing pin or similar part. A first abutment 17a and a second abutment 17b, as well as an articulation point 18 in the form of an attachment pin or similar part, are firmly attached to the second lever element 14b, and they can be swiveled with the latter element about the bearing pin 16. The articulation point 18 serves to attach a spring element, here a tension spring 19, which is firmly applied with its other end to an articulation point 20 on the support 10. The articulation point 18 presents a separation with respect to the rotation axle 16, and it is arranged in such a way that a straight connection between the articulation points 18 and 20 does not pass through the rotation axle 16 in the two end positions according to FIGS. 3 and 4.

Moreover, an actuation element 21, in the form of an actuation pin or a similar part, which protrudes over the support 10, is firmly connected to the second lever element 14b of the knee lever 14.

The knee lever 14 and the arrangement of the articulation points 18, 20 of the tension spring 19 is constructed in such a way that the two roller levers 12a, 12b are located in a parallel position with the same orientation if the two lever members 14a, 14b assume a relative position with respect to each other forming a large, obtuse angle which, however, is preferably different from 180° (FIG. 3). In this relative position of the lever members 14a, 14b, the parallel position of the roller levers 12a, 12b is determined by the abutment 17b which abuts against a counterpiece fixed to the support, and which is stopped by a spring 19 located on one side of its dead center. Thus, the spring 19 ensures a bistable stopping of the knee lever 14 in the two end positions defined by the abutments 17a, 17b on both sides of the stretch position. In addition, it supports, if needed, the approach to these end positions, so that the control surfaces 22 in each case need to swivel the lever member 14b only until the spring 19 has passed its dead-center or stretch position. The stabilization in the parallel position of the swivel lever 12a according to FIG. 3 is additionally supported by the fact that the articulation 15 lies slightly under the connection line drawn with a dot and dash between the articulation 6 and the axle 16.

The scissor position of the two roller levers 12a, 12b shown in FIG. 4 is defined by a relative position of the lever members 14a, 14b forming a smaller, obtuse or acute angle, which is determined by the abutment 17a being applied to a counterpiece which is firmly attached to the support. To reach this position, the first lever element 14b pulls the second lever element 14a along, while the articulation point 18 of the spring 19 moves over the dead center into its second stopping position, in which the position of the roller levers 12a, 12b shown in FIG. 4 is stopped.

The swiveling of the lever element 14b and thus of the roller lever 12a on the support 10 is effected by the actuation element 21 coming in contact with a control surface 22 (FIG. 2), which is arranged there on the sliding carriage 5, where it is necessary to separate at least apart of the track rollers, for example, the track rollers in the outer portion of the curve at the transition between the parallel areas 2a, 2b and the deflection members 5a, 5b, from the guideway 2, and bring them back in engagement with the guideway 2. As shown in FIG. 2, the control surface 22 is preferably constructed as a curved ramp. However, it should be pointed out that the design of the control surfaces and their arrangement and orientation must obviously be adapted to the type of the chain link 8.

Figure 5:
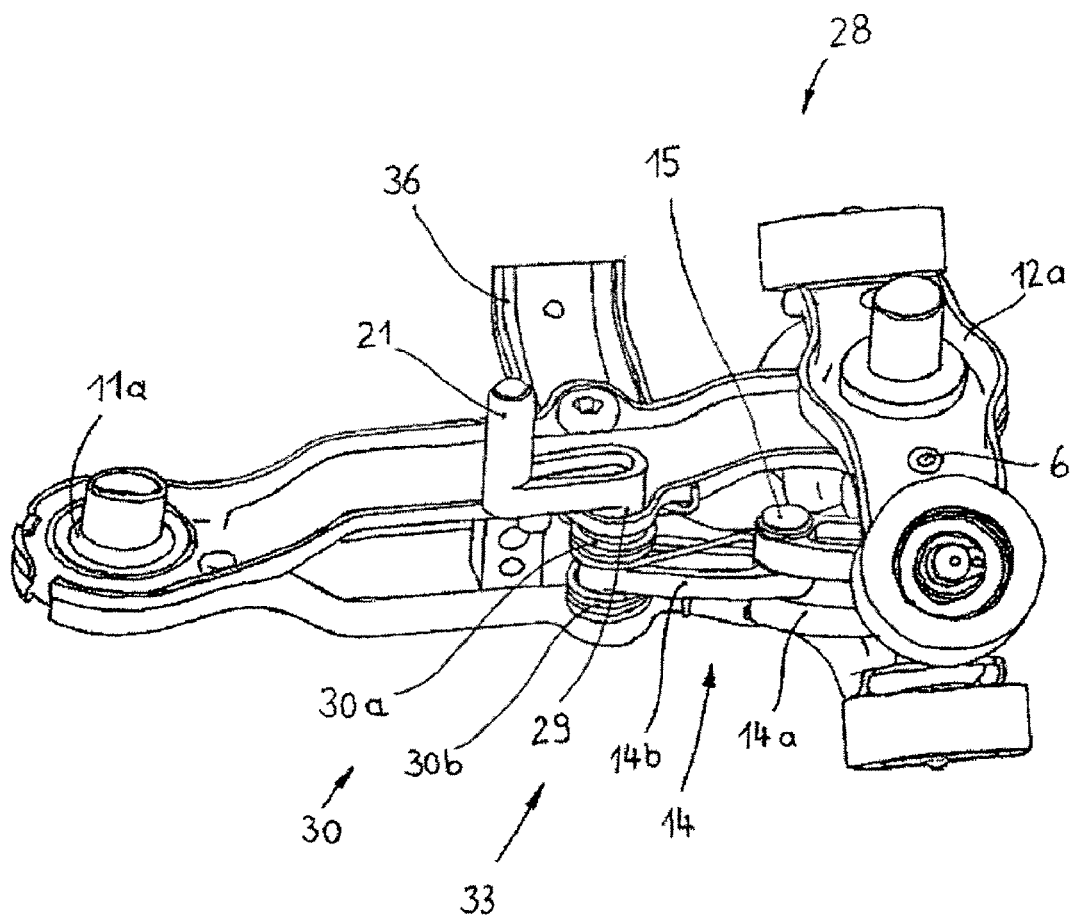
FIG. 5 shows a perspective representation of an additional embodiment example of the disclosure.

FIG. 5 shows an additional embodiment example of a chain link 28, which corresponds to the chain link 8, except for the details described below. The first chain link 28 also contains a knee lever 14 whose first lever member 14a is connected in a way which allows swiveling to the swivelable roller lever 12a by means of an articulation 6, and whose second lever member 14b is connected to an actuation element 21. The actuation element 21 actuates a rotation pin 29, to which the second lever member 14b is attached. The swivel mechanism 33 of the chain link 28 again contains a spring element, which, however, is designed as a torsion spring here, preferably as two torsion springs 30a, 30b. Each one of the torsion springs 30a, 30b with one of its ends abuts against the knee lever 14 in a relative position of the two lever members 14a, 14b, which corresponds to the parallel position of the roller levers 12a, 12b. The other end of the torsion springs 30a, 30b rests with firm connection on the support. When the actuation element 21 engages with an appropriate control surface 22, then the rotation pin 29 together with the knee lever 14 turns against the force of the torsion spring 30a, 30b in a relative position, which corresponds to the scissor position of the roller levers 12a, 12b. However, as soon as the engagement between the actuation element 21 and the control surface 22 is released, the spring element 30 presses the knee lever 14 again into a relative position of its lever members 14a, 14b, which corresponds to the parallel position of the roller levers 12a, 12b.

Figure 6:
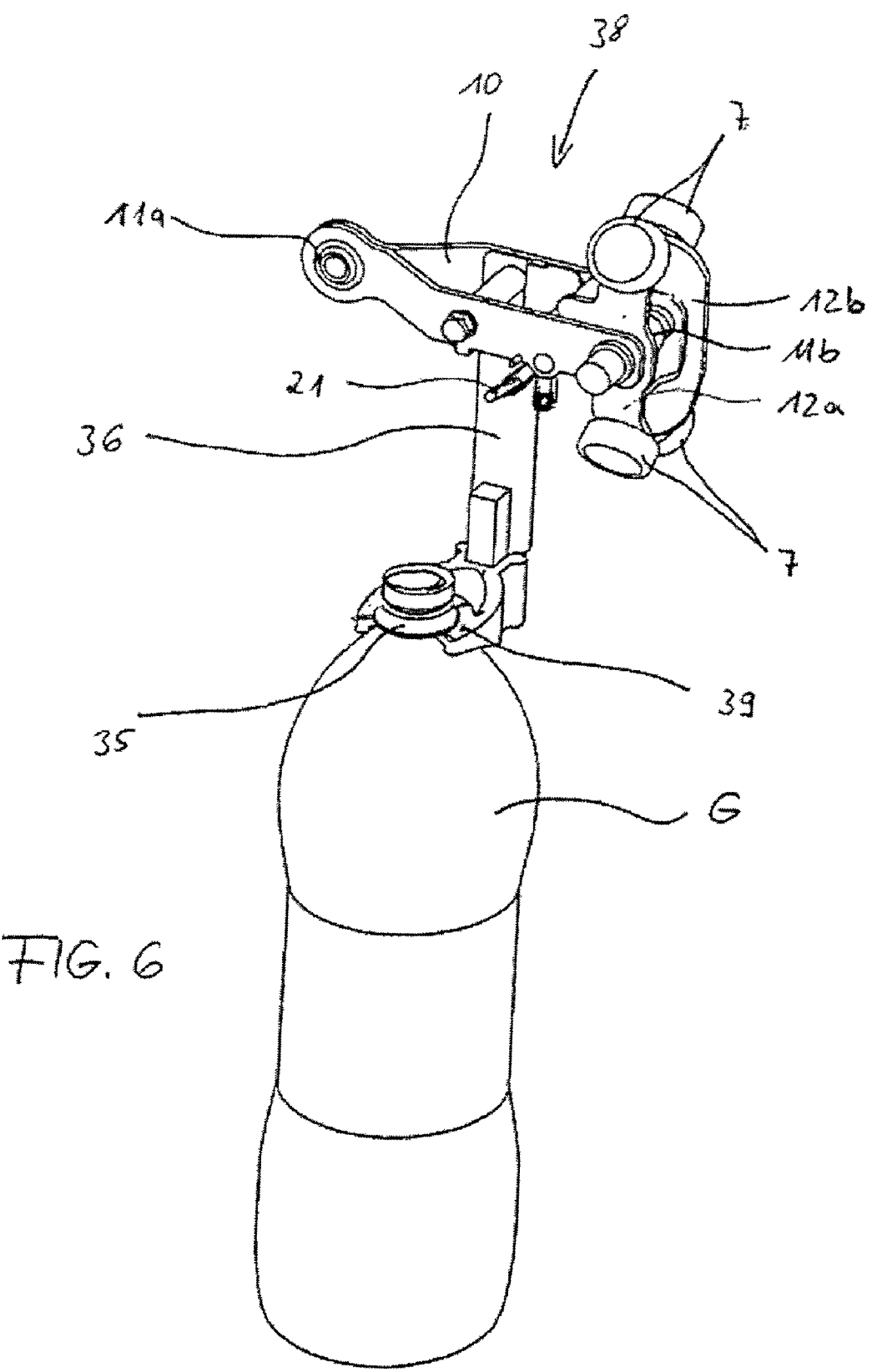
FIG. 6 shows a chain link according to the disclosure in a first use.
Figure 7:
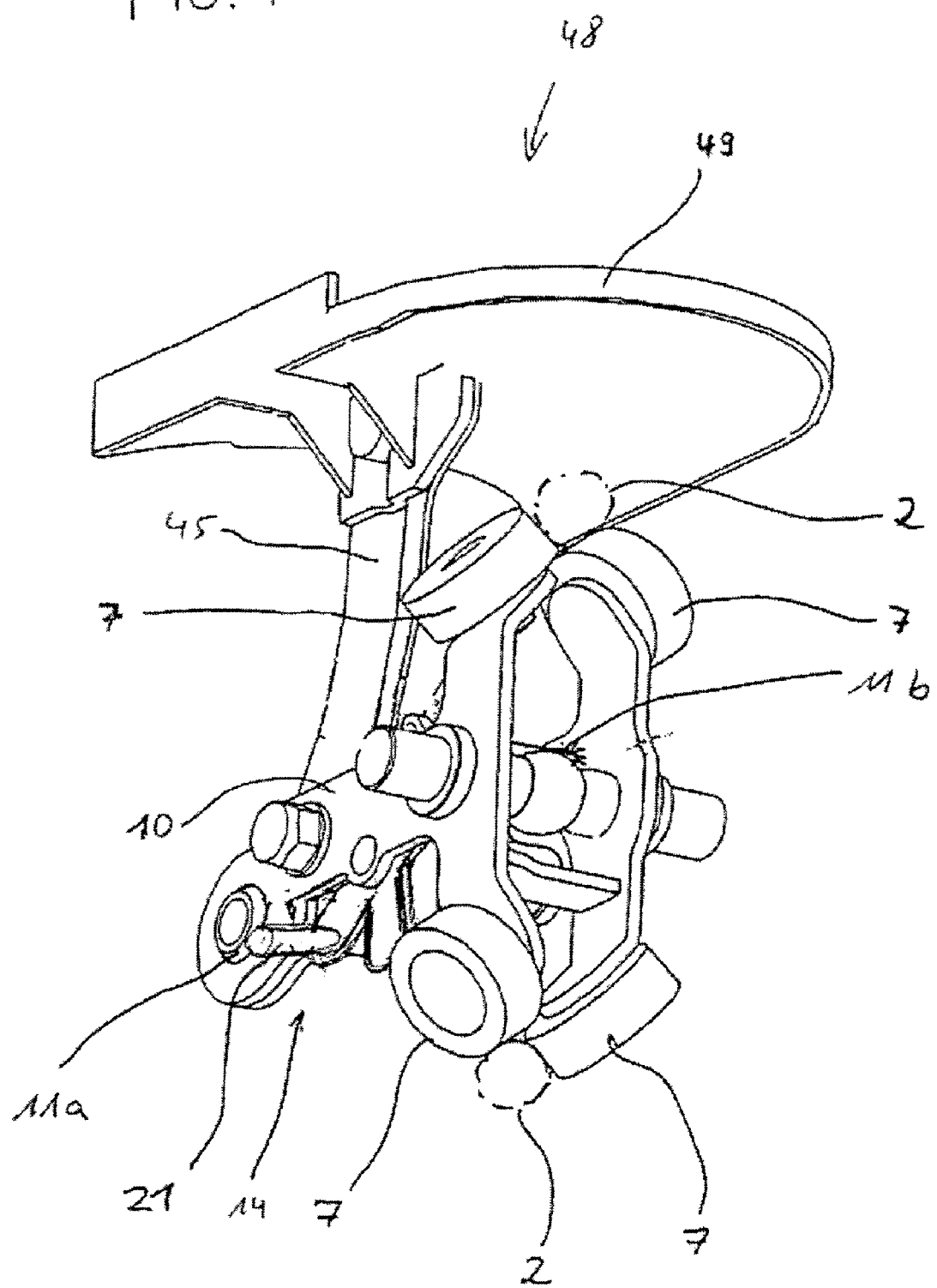
FIG. 7 shows a chain link according to the disclosure in a second use.

FIGS. 6 and 7 show embodiment examples of the chain links 38 and 48, respectively, which are adapted by means of different holding devices for the transport of different objects G. The chain link 38 contains an elastic gripper 39, by means of which a bottle or container-shaped object G can be gripped, for example, under a neck area or a protruding carry ring 35. The gripper 39 is connected via a gripper support 36 to the support 10 of the chain link 38.

FIG. 7 shows an additional chain link 48, which is equipped with a holding device in the form of a base plate 49, on which the objects G can be transported in a standing or lying position. The base plate 49 as well is firmly connected via plate support 45 to the support 10 of the chain link 48.

In contrast to the described and drawn embodiment examples, the attachment devices for the objects can be of any appropriate shape. Magnets can be used instead of spring elements to stop the position of the swivelable roller lever and/or as actuation elements to swivel the roller lever. The roller levers can also be designed as a one-sided lever, and provided with one track roller or with a set or track rollers. The actuation element does not necessarily have to engage on one of the lever members, rather, it can engage also on the articulation, for example. Moreover, the disclosure can be applied not only with conveyor chains, but also with other conveyance means, for example, with self-driven vehicles. Using an appropriate elastic design of the lever members, it is possible to omit additional spring elements. The abutments used to define the end position of the knee lever can also be attached to the swivelable roller lever. The lever member which is attached to the chain link can also turn over in one direction like a crank.

The invention claimed is:

1. Conveyance means (1) comprising track rollers (7) supported on a guideway (2), at least one track roller (7) being attached with the help of a swivel mechanism (13, 33) to a roller lever (12a), the roller lever (12a) being swiveled between a first and a second position and which can be stopped in a position, the swivel mechanism (13, 33) having a knee lever (14) with a first and a second lever member (14a, 14b), the first and the second lever member being connected to each other via an articulation (15), and the knee lever being in connection with an actuation element (21), wherein the actuation element contains a control surface engageable with an additional control surface outside of the conveyance means, and wherein the knee lever presents at least one spring element for stopping the first and second lever members in at least one relative position.

2. Conveyance means according to claim 1, wherein the spring element contains a torsion spring.

3. Conveyance means according to claim 1, wherein the at least one spring element is prestressed.

4. Conveyance means comprising track rollers supported on a guideway, at least one track roller being attached with the help of a swivel mechanism to a roller lever, the roller lever being swiveled between a first and a second position and which can be stopped in a position, the swivel mechanism having a knee lever with a first and a second lever member, the first and the second lever member being connected to each other via an articulation, and the knee lever being in connection with an actuation element, wherein the actuation element contains a control surface engageable with an additional control surface outside of the conveyance means, and wherein the knee lever contains at least one magnet element for stopping the first and second lever members in at least one relative position.

* * * * *